US006217105B1

(12) United States Patent
Hollerbach

(10) Patent No.: US 6,217,105 B1
(45) Date of Patent: Apr. 17, 2001

(54) ARRANGEMENT FOR HYDRAULICALLY OPERATING A REAR COVER

(75) Inventor: Bernhard Hollerbach, Steingaden (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 0 days.

(21) Appl. No.: 09/316,018

(22) Filed: May 21, 1999

(30) Foreign Application Priority Data

May 22, 1998 (AU) ................................................ A882/98

(51) Int. Cl.[7] ........................................................ B60J 7/20

(52) U.S. Cl. ............................ 296/136; 296/117; 296/76; 296/115

(58) Field of Search ............................. 296/117, 76, 115, 296/136, 112, 102

(56) References Cited

U.S. PATENT DOCUMENTS 4,359,119 * 11/1982 Kammerman .......................... 296/76
4,644,235 * 2/1987 Ohta .................................... 296/117
4,688,844 * 8/1987 Hirose et al. .......................... 296/76
4,749,193 * 6/1988 Hacker ................................ 296/117
4,779,845 * 10/1988 Bartesch et al. ....................... 296/76
4,858,981 * 8/1989 Post ........................................ 296/75
5,110,175 * 5/1992 Fischbach ............................ 296/117
5,279,119 * 1/1994 Shelhart et al. ..................... 296/117
5,335,926 * 8/1994 Stolle .................................. 296/117
5,682,807 * 11/1997 Mentink .............................. 296/107
5,760,695 * 6/1998 Huber .................................. 296/117
5,788,312 * 8/1998 Lee ........................................ 296/76

* cited by examiner

*Primary Examiner*—Joseph D. Pape
*Assistant Examiner*—Kiran Patel
(74) *Attorney, Agent, or Firm*—Dykema Gossett PLLC

(57) ABSTRACT

An arrangement for hydraulically operating a rear cover, covering top or the like (1) on a vehicle, with at least one double-acting hydraulic working cylinder (3), which, on the one hand, is connected to the vehicle and, on the other hand, to the covering top wherein its working chambers (8, 9) are in connection with each one side of a switched pressure source (12) via one check valve (10, 11) each, wherein both of the check valves have an mutually releasing device and each of the working chambers parallel with respect to the check valves is kept via a pre-stress valve (15, 16), which steers into the tank, at a specified pressure level. To make possible, in a simple and safe way, an emergency operation of the covering top (1) also in the common working cylinders having different volumes of the working chambers (8, 9) on the side of the piston and valve stem, between at least one working chamber (8, 9) and the corresponding releasable check valve (10, 11), a separate after-suction line (23) enters which leads to the tank (17) and in which a check valve (24) is inserted which is open in the direction of the working chamber (8).

3 Claims, 1 Drawing Sheet

ARRANGEMENT FOR HYDRAULICALLY OPERATING A REAR COVER

BACKGROUND OF THE INVENTION

1. Field of the Invention

The invention relates to an arrangement for hydraulically operating a rear cover, covering top or the like on a vehicle, with at least one double-acting hydraulic working cylinder, which, on the one hand, is connected to the vehicle and, on the other hand, to the covering top; and its working chambers are in connection with each one side of a switched pressure source via one check valve each, wherein both of the check valves have an mutually releasing device and each of the working chambers parallel with respect to the check valves is kept via a pre-stress valve, which steers into the tank, at a specified pressure level.

2. The Prior Art

Arrangements of the noted type are known and make possible, for example, the automatic operation of vehicle doors, engine hoods, maintenance caps or also of covering tops of trunks or a chamber holding a convertible top. By means of the releasable check valves, it is ensured that, in the case that the operational pressure is turned off or fails, the covering top remains hydraulically blocked in the respective position, in order to switch off uncontrolled movements and thus possibly resulting dangers. The pre-stress valve makes possible the further controlled movement of the covering top in this condition, for example, by hand, to allow for an emergency closure against the force specifed by the pre-stress valve.

A disadvantage of the described known arrangement of the mentioned type is especially the condition that the described emergency operation is only possible in connection with a volume-balanced working cylinder, since otherwise there are problems with the removal or supply of the hydraulic medium to the working chamber on the side of the piston or valve stem. A simple redirection of the excess volume pushed out of the individual working chamber into the tank would still be possible; however, there are problems with the pressure-less re-supply of hydraulic medium to the other working chambers in the case of an emergency, since for the use in vehicle, on the one hand, very thin, flexible lines have to used which, on the other hand, due to the tight accommodations, are relatively long, so that the after-suctioning working chamber is at least partially filled with fumigated air. This then results in that, after the release of the manually-operated covering top in an emergency, these fall back undefined and can cause damage and injury.

It is the object of the present invention to improve a known arrangement of the initially described type such that the described disadvantages can be avoided and especially that, in a simple and safe way, an emergency operation of the covering top is made possible also in the common working cylinders having different working chamber volumes on the side of the piston and valve stem.

SUMMARY OF THE INVENTION

This problem is solved through an arrangement of the initially mentioned type according to the invention in that between at least one working chamber, preferably the working chamber on the piston side, and the corresponding releasable check valve, a separate after-suction line enters which leads to the tank and in which a check valve is inserted which is open in the direction of the working chamber. In the case of a failure of the hydraulic working pressure, a simple and safe emergency operation of the covering top, for example, manually is thus still possible. In the case that the working cylinder is pulled outward manually, the working chamber volume on the side of the valve stem is pushed off into the tank, wherein a failure in the differential volume is suctioned from the tank via the check valve. Since there are no further hydraulic elements in the after-suction line such as valves, jets etc. are connected and the line does not have to fulfill any other functions as well, it can be set up completely for the function of the after-suction and arranged such that even during a very fast manual operation of the rear cover, the covering top or the like, a suctioning of the hydraulic medium is guaranteed without fumigation of air. Thus, furthermore, the secure holding of the manually moved vehicle part in the respective position is ensured, since neither fumigated air is compressed, nor can the hydraulic liquid flow back into the tank.

Of course, the after-suction line with the check valve can also be provided on the valve stem side of the working cylinder and thus ensure the uninhibited after-suction of the hydraulic medium during the manual closing of the covering top or the like as well as the securing afterwards against any unintentional pressing. Thus, especially in the case of gas springs or the like which support the opening process or are automatically activated at a corresponding force, it is ensured that also upon failure of the operational hydraulics the covering top or the like is kept in the manually set position. Also the after-suction and security function for the manual opening and closing by providing an after-suction line with a check valve on the valve stem side as well as the piston side of the working cylinder is thinkable, alternatively also the connection of an after-suction line with a check valve on interchangably one of the lines to the working cylinder via a switching valve.

In a preferred embodiment of the invention, it is provided that the after-suction line enters between the individual working chamber and the neighboring hydraulic part. Thus, the direct and uninhibited after-suction of hydraulic medium from the tank, independently of the equipment of the automatic operation system, and its optimal arrangement with respect to its function during manual operation is made possible.

The invention will be better understood by referring to the attached drawings and the following discussion.

DETAILED DESCRIPTION OF THE PREFERRED EMBODIMENT

Figure 1:
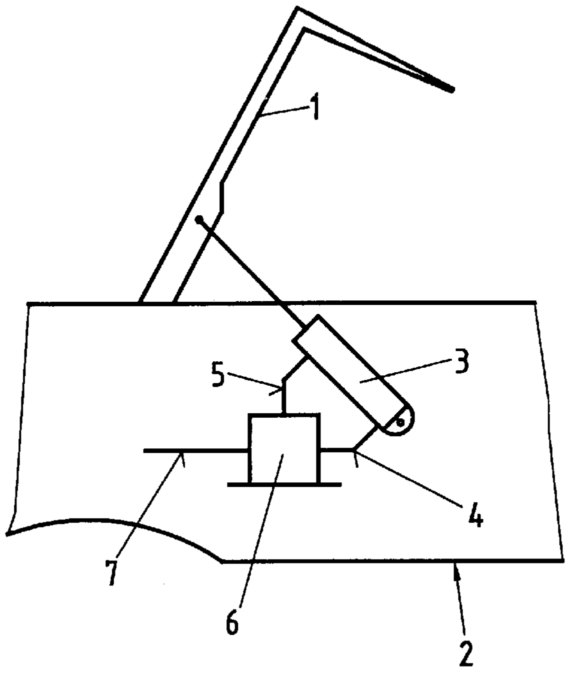
FIG. 1 shows a schematic arrangement according to the present invention in a vehicle.

The arrangement illustrated in FIG. 1 for the hydraulic operation of a covering top, a rear cover or any other movable vehicle part 1 on a vehicle 2 has at least one double-acting hydraulic working cylinder 3 which, on the one hand, is connected to a vehicle 2 and, on the other hand, to a covering top 1. The working chambers of the working cylinder 3 are connected via lines 4, 5 to a hydraulic aggregate 6, which is in connection with the electrical on-board network of the vehicle 2 via a connecting line 7.

Instead of the direct connection of the working cylinder 3, which naturally requires the corresponding movable lines 4, 5 or a hydraulic aggregate 6 with a working cylinder 3 which moves along with it, the connection of the working cylinder 3 onto the vehicle and/or covering top side can also occur indirectly via levers, hinge arrangements or the like, wherein the working cylinder 3 could also be tightly mounted relative to the vehicle 2.

Figure 2:
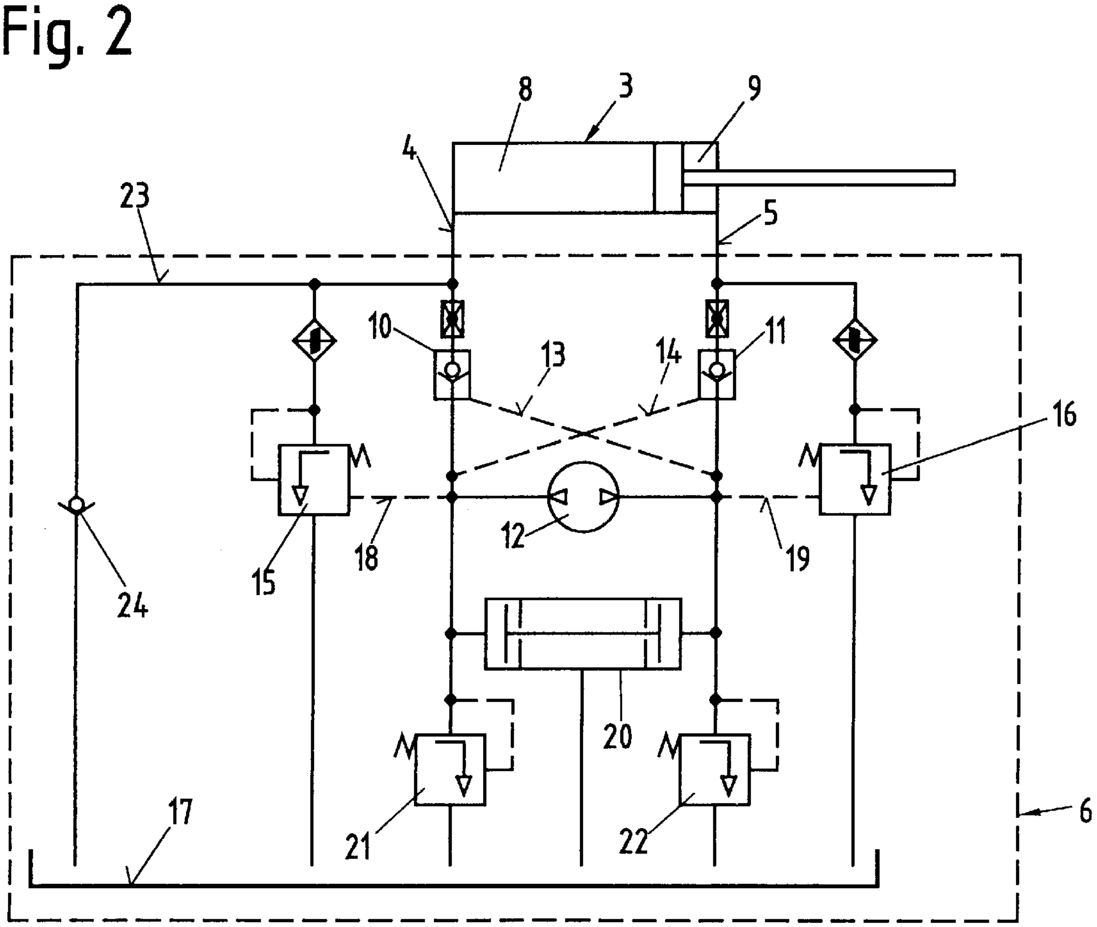
FIG. 2 shows a schematic hydraulic circuit diagram of an arrangement according to the invention.

In FIG. 2, illustrated in more detail is a combination of hydraulic aggregate 6 and the working cylinder 3 connected via the lines 4, 5. Both of the working chambers 8, 9 of the working cylinder 3 are in connection, via the lines 4, 5 and one check valve 10, 11 each as arranged in the hydraulic aggregate 6, with one side each of the switchable pressure source 12 (here consisting of a pump and a drive motor). Both of the check valves 10, 11 are connected via lines 13, 14 and can be mutually released. Via one pre-stress valve 15, 16 each, both of the working chambers 8, 9 parallel to the check valve 10, 11 are steered off into the tank 17, as soon as a set pressure level is reached or exceeded. The pre-stress valves 15, 16 can be hydraulically blocked off via lines 18, 19 and the pressure prevailing in front of the check valves 10, 11 on the side of the pump.

The connection line 7 which can be seen in FIG. 1, which is not separately illustrated in FIG. 2, controls the motor of the pump of the pressure source 12 and a change-over valve 20 between the lines leading to the tank 17 and adjustable via pressure-limiting valves 21, 22. Furthermore, via this connecting line 7, also, for example, limit switches or other position controls could send signals to control units or the like not shown in the figures.

In the line 4 to the piston-side working chamber 8 of the working cylinder 3, an after-suction line 23 enters with a check valve 24 opened towards the working chamber 8, via which, after-suction line 23 upon manual extension of the working cylinder 3,hydraulic liquid can be after-suctioned from the tank 17 into the working chamber 8.

In the following, the function of the illustrated arrangement as shown in FIG. 2 is explained. In the hydraulic opening or closing, the working cylinder 3 extends or retracts. The motor of the pump of the pressure source 12 is electrically charged, the pump r and supplies pressure medium via the check valves 10 or 11 into the piston-side working chamber 8 or the valve stem-side working chamber 9. Via the lines 18 or 19, the pre-stress valve 15 or 16, which lies on the same side as the through-flown check valve, is controlled. The pressure in the working chamber 8 or 9 can increase to a required value. The covering top 1 (FIG. 1) opens or closes hydraulically until the impact in the working cylinder 3. The volume of the valve stem-side working chamber 9 flow s off during the opening via the check valve 10 hydraulically controlled via the line 14 and via the change-over valve 20 into the tank 16. Depending on the counterweight or the counter force at the covering top 1, the hydraulics supply a total of the force adjusted at the pressure-limiting valve 21 or 22. The pump runs until the covering top 1 is opened and is then turned off.

During the hydraulic closing , the pump motor of the pressure source 12 is again electrically charged, wherein here then pressure medium is transported via the check valve 11 into the valve stem-side working chamber 9. The top 1 closes with a force that is adjustable at the pressure-limiting valve 22. The volume flowing from the piston-side working chamber 8 flows off via the check valve 10 controlled by the line 13 as well as the change-over valve 20 into the tank 16. In so doing, the closing force cannot be set higher than the pressure-limiting valve, by which means it can be realized that the covering top 1 can also, in emergency cases, be stopped manually. In stopping the hydraulic operation, the covering top 1 is held by the pressure set at the pre-stress valves 15 and 16.

In the manual opening of the covering top 1, for example, during failure of the pressure source 12 as a result of a failure in the electrical supply, it can be opened at a relatively small expenditure of force. Only the weight force of the covering top 1 itself as well as the flow resistance in the hydraulics are to be overcome. Gas springs, optionally built into the vehicle and gripping onto the covering top 1 acting in an additionally supporting manner. The pressure medium flows with almost no pressure from the valve stem or piston rod-side working chamber 9 through the pre-stress valve 16 which is open due to the missing pressure and thus with little necessary expenditure of force into the tank 17. At the same time, with a minimum of resistance, because only one check valve 24 is provided and the line can be optimally arranged, hydraulic liquid is after-suctioned from the tank 17 through this line 23 into the piston-side working chamber 8. As soon as the manual operation is completed, the check valve 24 is closed and inhibits a flowing-back of the pressure medium into the tank. It is extremely important that the suction is as free from resistance as possible, so that the covering top 1 remains in position after that type of emergency operation and cannot fall back onto an air cushion in this working chamber 8, which could pose a large safety risk. As a result of the reduced pressure in the case of a non-filled piston-side working chamber, air would be released from the pressure medium.

To offer the above-described function alternatively or in addition on the valve stem-side of the working cylinder 3 and thereby secure the covering top 1 or the like against pressing, for example, through a strong gas spring arrangement compressed by the weight of the covering top 1, the after-suction line 23 can be lead to the line 5 instead of line 4, the former of which supplies the valve stem-side working chamber 9 with hydraulic medium. Also the connection of both working chambers 8, 9 with the tank 17 via an after-suction line with a check valve would be possible, wherein, upon manual operation, during inactive operational arrangement the covering top 1 or the like is kept in each position reached. Besides the illustrated and described arrangement and operation of a covering top 1 according to FIG. 1 (for example, at a trunk or the engine hood of a motorized vehicle), the arrangement according to the invention could naturally also be used for the operation of rear covers that are vertical in the closed state, for example, of a station wagon or a bus. Other uses would be, for example, vehicle doors, maintenance or ventilation caps and the like.

What is claimed is:

1. A hydraulic assembly for moving a movable part of a vehicle relative to the vehicle, said hydraulic assembly comprising:

a working cylinder which is connected between the movable part and the vehicle includes a cylinder and a piston having a rod, said piston being movable within the cylinder so as to define a piston chamber and a rod chamber within said cylinder, and a hydraulic system connected to said working cylinder, said hydraulic system comprising:

a tank for containing hydraulic medium, a first hydraulic line connected between said piston chamber and said tank, said first hydraulic line containing a first check valve, a second hydraulic line connected between said rod chamber and said tank, said second hydraulic line containing a second check valve, release means connected to said first and second check valves for mutual release, a third hydraulic line connected to said first hydraulic line at a location between said piston chamber and said first check valve and extending to said tank, said third hydraulic line containing a first pre-stress valve, a fourth hydraulic line connected to said second hydraulic line at a location between said rod chamber and said second check valve and extending to said tank, said fourth hydraulic line containing a second pre-stress valve, a switchable hydraulic pressure means connected to both said first and second hydraulic lines between said respective first and second check valves and said tank, and a fifth hydraulic line connected to one of said first and second hydraulic lines, said fifth hydraulic line including a one-way check valve which allows hydraulic medium to be suctioned therethrough from said tank to said working cylinder.

2. A hydraulic assembly according to claim 1, wherein said fifth hydraulic line is connected to one of said first and second hydraulic lines between a check valve therein and said working cylinder.

3. A hydraulic assembly according to claim 2, wherein said fifth hydraulic line is connected to said first hydraulic line between said first check valve therein and said piston chamber.

* * * * *